Oct. 8, 1940.  W. A. SAUL  2,217,419
THERMOSTATICALLY CONTROLLED DEVICE
Original Filed Dec. 24, 1935   3 Sheets-Sheet 1

Waldo A. Saul,
Inventor,
Delos G. Haynes,
Attorney.

Oct. 8, 1940.  W. A. SAUL  2,217,419
THERMOSTATICALLY CONTROLLED DEVICE
Original Filed Dec. 24, 1935   3 Sheets-Sheet 2
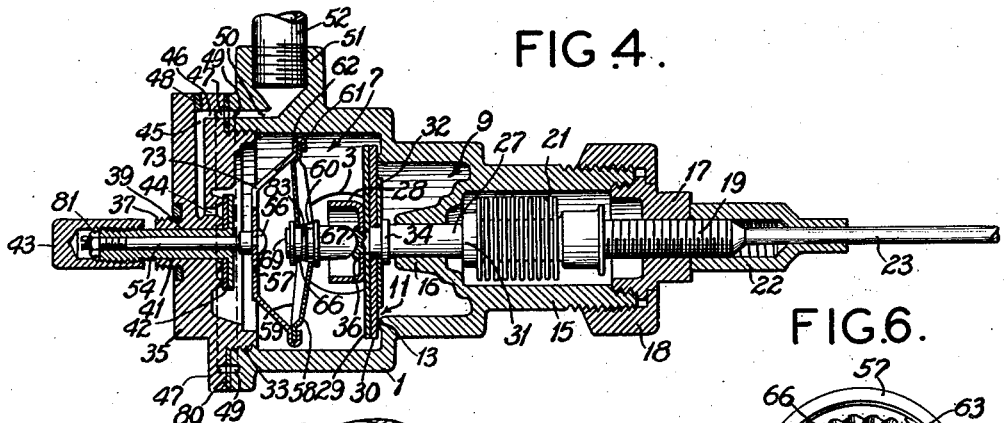
FIG.4.
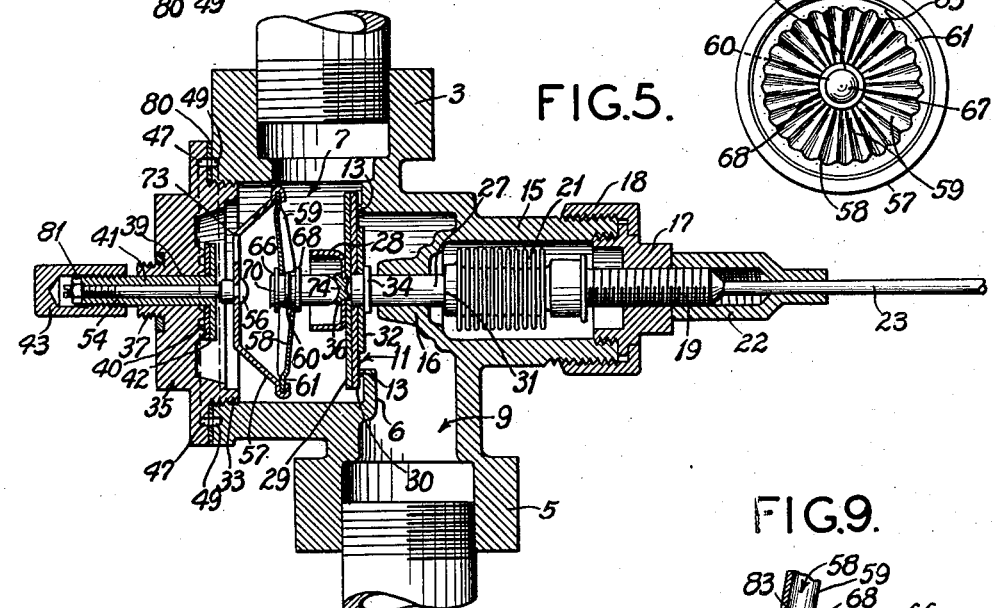
FIG.5.
FIG.6.
FIG.9.
FIG.7.  FIG.8.
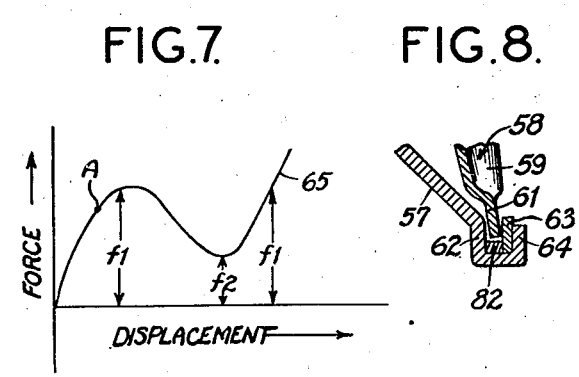
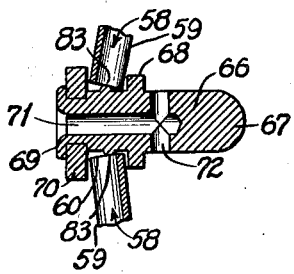
Waldo A. Saul,
Inventor,
Delos F. Haynes,
Attorney.

Waldo A. Saul,
Inventor,
Delos F. Haynes,
Attorney.

Patented Oct. 8, 1940

2,217,419

UNITED STATES PATENT OFFICE 2,217,419

THERMOSTATICALLY CONTROLLED DEVICE

Waldo A. Saul, Lexington, Mass., assignor, by mesne assignments, to Metals & Controls Corporation, Attleboro, Mass., a corporation of Massachusetts Application December 24, 1935, Serial No. 56,071
Renewed November 22, 1937

11 Claims. (Cl. 137—139)

This invention relates to thermostatically controlled devices, and with regard to certain more specific features, to thermostatically controlled safety pilot valves having a manual reset mechanism.

Among the several objects of the invention may be noted the provision of a thermostatically controlled device of the class described which performs a closing function automatically upon a predetermined drop of temperature but which is incapable of performing the respective reverse function without manual actuation; the provision of a device of the class described which performs its automatic function with a snap-action without the use of latches, pivot points, or toggles thus operating with less friction and hence being more accurate in its response to temperature change; the provision of a safety pilot valve of the class described wherein initial manual operation provides for flow of gas to a pilot burner but without opening the main flow of gas, the main flow of gas being permitted only upon the attainment of a predetermined high temperature in the region of the pilot burner, and the flow of gas to the pilot burner being thereupon cut off; and the provision of a device of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a side elevation, partly diagrammatic, of a safety pilot valve embodying the present invention;

Fig. 4 is a vertical cross-section taken along line 4—4 of Fig. 2;

Fig. 5 is a horizontal axial section taken substantially along line 5—5 of Fig. 1;

Fig. 6 is a plan view of an actuating element in its housing;

Fig. 7 is a graphical presentation showing certain force-displacement characteristics of the actuating element of Fig. 5;

Fig. 8 is an enlarged cross-section of a detail of the mounting of the edge of the actuating element;

Fig. 9 is an enlarged cross-section of a detail of the mounting of the center of the actuating element.

Similar reference characters indicate corresponding parts throughout the several views of the drawings.

Figure 1:
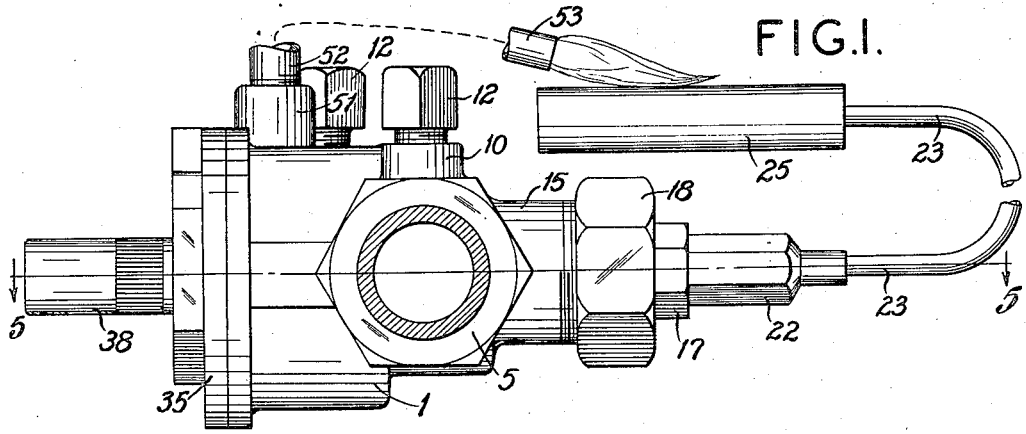

This invention is an improvement over the safety pilot illustrated in Fig. 1 of the copending application of John A. Spencer, Serial No. 719,704, filed April 9, 1934, now Patent No. 2,040,762, dated May 12, 1936.

Figure 2:
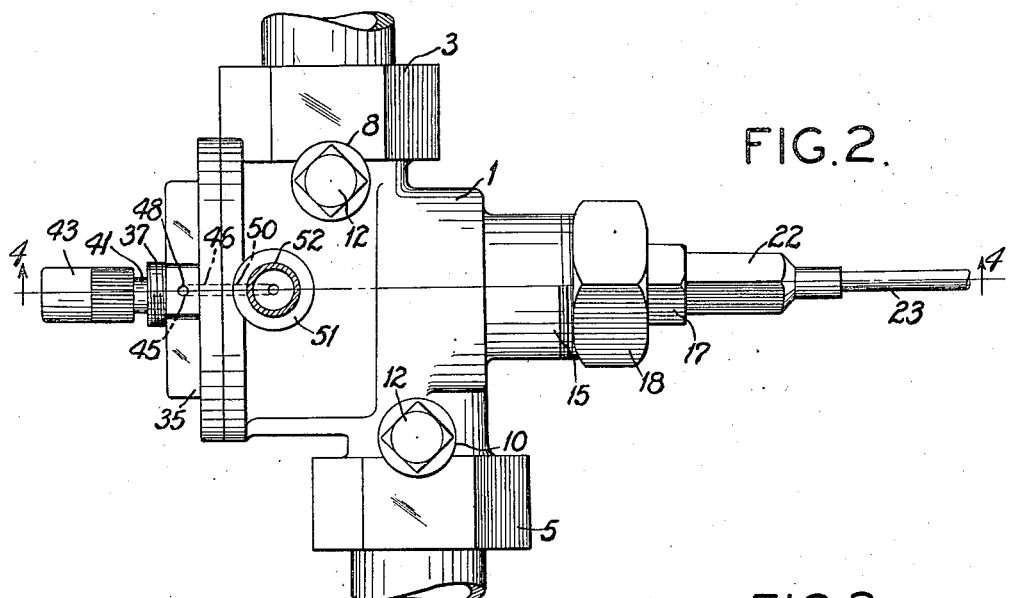
Fig. 2 is a top plan view of the valve of Fig. 1.
Figure 3:
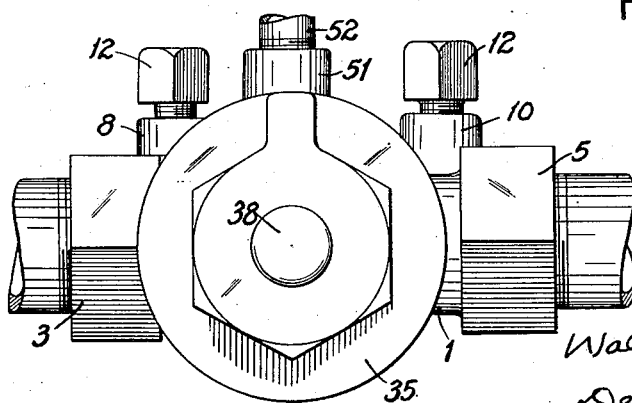
Fig. 3 is a left-hand end elevation of the valve of Fig. 1.

Referring now more particularly to Figures 1, 2, and 3, numeral 1 indicates a valve body having an inlet 3, and an outlet 5, respectively. The body 1 includes an internal chamber (see Figures 4 and 5), which is divided by a customary partition 6 into an inlet chamber 7 and an outlet chamber 9. The partition 6 includes an opening 11, which provides a valve seat 13, in the usual manner.

The inlet 3 and outlet 5 are provided with auxiliary openings 8 and 10, respectively, for pilot lines or the like. Opening 8 is normally not used, unless an unprotected constant-burning pilot flame is desired. Opening 10 is normally connected to a main pilot burner (not shown). In the drawings plugs 12 are shown as closing off the openings 8 and 10.

Extending in one direction from the valve casing 1 at right angles to the plane of the opening 11, is a cylindrical housing member 15, which inwardly terminates in a bearing portion 16. The member 15 is closed at its outer end by a plug 17, which is in turn held in position by a nut 18 threaded to the end of cylinder 15. The plug 17 has a central threaded opening to receive the threaded stem 19 of a flexible bellows 21. The relative position of the bellows 21 in the cylindrical member 15 may be adjusted by threading the stem 19 into and out of the plug 17. A lock nut 22 holds the bellows in position once it is established.

Sealed to the outer end of the stem 19 is a so-called capillary metallic tube 23, which is sufficiently flexible to permit of its being bent, without breaking, during installation of the device. To the other end of the tube 23 is affixed a bulb 25 (see Fig. 1). The bulb 25, tube 23, stem 19 and bellows 21 are all sealed together in a closed arrangement, so that no leakage of a fluid in the system may take place. Their particular construction is the subject of the copending application of John A. Spencer, Serial No. 696,344, filed November 2, 1933, now Patent No. 2,069,727, dated February 2, 1937.

The bearing portion 16 slidably receives a stem 27 to which is affixed valve closure element comprising a metallic disc 29, a leather facing 30, and a washer 32. A shoulder 34 on the stem 27 bears against the washer 32, while the end of the stem 27 is upset, as indicated at numeral 36, to clamp the closure assembly together. A cup-shaped element 28, to be referred to hereinafter, is likewise clamped with the assembly. The leather facing 30 is adapted to seat upon the valve seat 13, in order to place the valve in closed condition so that communication between inlet 3 and outlet 5 is cut off. The opposite end of the valve stem 27 abuts the inner end 31 of the bellows 21.

On the opposite side of the valve casing is provided a threaded opening 33 which is coaxial with the cylindrical housing 15. Into the opening 33 fits a threaded cap or plug 35, which outwardly terminates in a bearing portion 37, exteriorly threaded to receive a cap 38, shown only in Fig. 1. The bearing portion 37 includes a central opening 39 through which slides a stem 41. To the outer end of the stem 41 is threaded a manually operative knob 43. The knob 43 is preferably soldered in position. The inner end of the stem 41 carries a leather-faced back-seating valve closure element 42, which seats against a back-seating valve seat 40, comprising a pair of concentric beads formed on the inner face of the plug 35. There is provided a passage 44 connecting the trough between the beads 40 to a radial bore 45 (see Fig. 4), which in turn communicates with a bore 46 leading to an annular groove 47 in the face of the plug 35. The outer end of the bore 45 is sealed off, as indicated at numeral 48. The annular groove 47 juxtaposes an annular groove 49 of identical size in the face of the body portion 1. Communicating with this groove 49 is a passage 50 which leads to a threaded outlet 51. In operation, the outlet 51 receives a pipe 52 which conducts gas to a preheat pilot burner 53 (see Fig. 1) which is adapted to heat the bulb 25. A washer 80, which is positioned between the plug 35 and the body 1, has suitable openings at spaced intervals to permit gas to flow from annular groove 47 to annular groove 49.

Inwardly threaded into the stem 41 (see Fig. 5) is a pin portion 54 of reduced diameter. A lock nut 81 holds the pin 54 in fixed position. The inner end of the pin 54 carries a collar against which is seated a housing 57. The housing 57 is held in position by upsetting the end 56 of the pin 54. The housing 57 is somewhat frusto-conical in shape, and carries mounted at its open, wider side, a spring actuating element 58. The actuating element 58 is preferably a radially corrugated snap-acting disc, and is preferably made in accordance with the teachings of John A. Spencer Patent 1,972,172, dated September 4, 1934. It comprises (see also Fig. 6) a disc of resilient metal, such as spring brass, steel or the like, which is provided with a relatively large number of radial corrugations 59, a central opening 60, and a flat uncorrugated rim portion 61. The flat rimmed portion 61 (see Fig. 8) seats upon a shoulder 62 formed in the housing 57. A washer 82, which is thicker than the rim 61, spaces the disc peripherally. A second washer 63 is placed on the other side of the rim 61, and the edge of the housing is then overturned or spun inwardly, as illustrated at numeral 64, in order to secure the disc 58 relatively loosely in position. The washer 82 provides a relatively loose mounting, which is important in order to permit the snapping movement of the disc 58, as will be pointed out hereinafter. The diameter of the housing 57 is such that it slides easily in the cylindrical chamber 7 of the body portion 1.

The disc 58 is initially formed in such manner that its general shape is slightly conical in one direction. As a result of the initial shaping of the disc, it may be overcentered by applying a force to occupy a conformation of conicity in the opposite direction.

The disc 58 is distinctive in its characteristic curve for the applied force against the displacement, which is shown in Fig. 7. While this curve is described in more detail in the said Spencer Patent 1,972,172, it will also be described herein, but only to the extent necessary to enable a full understanding of the present invention.

Considering zero displacement to represent the conformation of the disc as it is initially shaped, and considering the distance through which the central portion of the disc travels in over-centering as a finite positive displacement, the curve indicated by numeral 65 in Fig. 7 represents the characteristic displacement to be had for increasing applied forces. Following the curve 65 from the origin, it will be noted that at first relatively little displacement is obtained as the applied over-centering force is increased until said force builds up to a value $f1$. However, the instant after the force $f1$ has been achieved, displacement will increase rapidly even under an applied force less than the value of $f1$. That is to say, in the portion of the curve 65 immediately beyond its first crest, the displacement increases with a decreasing applied force, which is, of course, contrary to the ordinary type of spring, which obeys Hooke's Law. Thus, the force may be gradually decreased along values determined by the curve 65, with the displacement none the less increasing. This action continues until the force has diminished to a value $f2$. Thereafter, according to the curve 65, it is again necessary to increase the applied force in order to procure an increased displacement. If the force $f1$ is applied by a resilient spring or by a resilient thermostatic element, such as the bellows 21, having a force-displacement curve with a slope less than that of the curve of Fig. 7 between $f1$ and $f2$, an accelerated movement or snap of the center of the disc will occur from the $f1$ to the $f2$ position.

From the above, it will be seen that the following action is characteristic of the disc 58: From its initial zero displacement position, it requires a relatively large force $f1$ to initiate any considerable degree of displacement. But once the force $f1$ has been reached, the applied force may be diminished and the displacement will still be increased. The force $f2$ will be sufficient to hold the disc in a position of comparatively great displacement, although a larger force $f1$ has been necessary to get the disc to such a displacement. For purposes of brevity, the Fig. 5 position of the disc with the displacement less than that corresponding to a force $f1$ will hereinafter be termed the position of "absolute stability" of the disc, and the position of the disc in its displaced position under the force $f2$ will be called the position of "comparative stability." The peculiar application of this type of disc in the valve of the present invention will be made apparent hereinafter.

While it is preferable to use, as the actuating element for the valve, a corrugated snap-acting disc as thus described, it will be apparent that other types of actuating elements will also be found useful.

Returning to Fig. 5, it will be seen that there is mounted in the central opening 60 of the disc 58, a plug element 66. The structure of this plug element 66 is shown in greater detail in Fig. 9. It has a cylindrical body with a rounded nose 67, an outwardly extending flange 68, and a bead 83. The opposite end of the plug receives a washer 70, which is in turn held in position by upsetting the end of the plug, as indicated at numeral 69. The inner periphery of the disc 58 is received loosely between the flange 68 and the washer 70. The loose fit is advisable in order to permit a freely snapping movement of the disc. The bead 83 aids in correctly positioning the disc 58. The plug 66 is longitudinally drilled as indicated at numeral 71, and laterally drilled, as indicated at numeral 72, in order to provide a free path for gas to pass from the right of the disc 58 (see Fig. 5) to the interior of the housing 57. A hole 73 is also provided in the back of the housing 57, in order to permit the gas to flow freely therethrough to the region of the chamber 7 back of the housing 57.

It will be seen that the rounded nose 67 of the plug 66 seats in a spherical bottom 74 provided by the upset end 36 of the valve stem 27. In assembly, the cup element 28 aids in centering the nose 67.

The various parts are so dimensioned that, with the valve 29 seated on the seat 13 and the disc 58 in its position of absolute stability (conical to the right, when referred to Fig. 5), the stem 41 is in its outwardly extended position with the back-seating valve 42 seated upon its seat 43. Under these conditions, the position of the threaded stem 19 in the plug 17 is likewise so adjusted that when the bulb 25 is cold, a firm contact is had between the end 31 of the bellows 21 and the valve stem 27, but little or no pressure is exerted on said valve stem 27 by the bellows 21.

Under these conditions, the resilient force of the disc 58, when in its position of absolute stability, is brought to bear upon the valve closure element 29 in such a manner as to seat it tightly upon its seat 13. The resilient force of the disc 58 is likewise brought to bear upon the back-seating valve 42, in such a manner as to seat it tightly upon its seat 40. Thus, no gas is permitted to pass from the inlet chamber 7 to either the outlet chamber 9 or to the pilot burner line 51.

The operation of the valve as thus described is as follows:

The system comprising the bellows 21 and bulb 25 is filled with a fluid or gas or the like which undergoes considerable volume change upon change of temperature. The choice of the fluid or gas to be used depends upon the range of temperature in which the device is to be used. Argon, for example, has been found best in the present instance because of the high temperature at which it is desired to operate the bulb. Argon is an inert gas even at high temperatures and the walls of the container are less permeable to it than to other inert gases. Under what will hereinafter be termed "cold" conditions, the volume of the fluid is such that the end 31 of the bellows 21 exerts a force substantially less than f2 upon the stem 27. This adjustment may be effected by loosening the nut 22 and rotating the threaded stem 19 to regulate the longitudinal position of the bellows 21 in the cylindrical housing 15, and thereafter re-tightening the nut 22.

The valve is initially considered to be in the position shown in Fig. 5. The first operation of the user comprises manually pushing button 43 into the valve casing. By so doing, the valve will assume the position shown in Fig. 10. By reference to Fig. 10, it will be seen that this action, in the first place, unseats the back-seating valve 42 from its seat 40, permitting passage of gas from the inlet chamber 7 through the passages 44, 45, 46, 50 and 52 in sequence, to the pilot burner 53. In thus pushing the button 43, the operator has displaced the disc 58 to the amount permitted by the degree of movement of the button, but not entirely to its position of comparative stability. With reference to the curve 65, Fig. 7, the disc is displaced to a point in the region of the indicated point A. This movement of the disc is accomplished by the movement applied on its periphery by the housing 57, reacting against the relatively stationary central portion of the disc, as held in position by the plug 66 abutting the seated main valve 29. If the operator relaxes the force on the button 43 to a value less than that required to hold the disc in its intermediate displaced position, it will be seen that the disc 58 immediately snaps back to its position of absolute stability, shutting off the back-seating valve.

Figure 10:
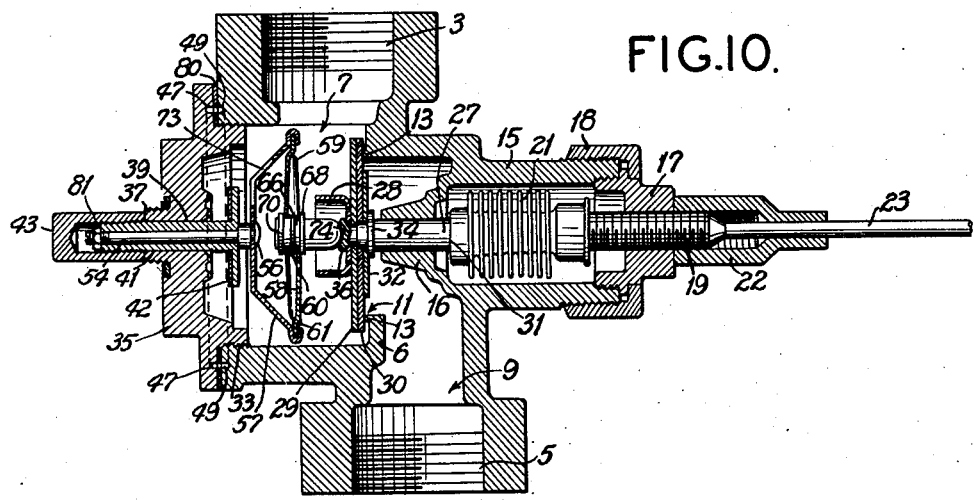
Figures 10, 11, and 12 are cross-sections similar to Fig. 5, illustrating progressively advanced positions.
Figure 11:
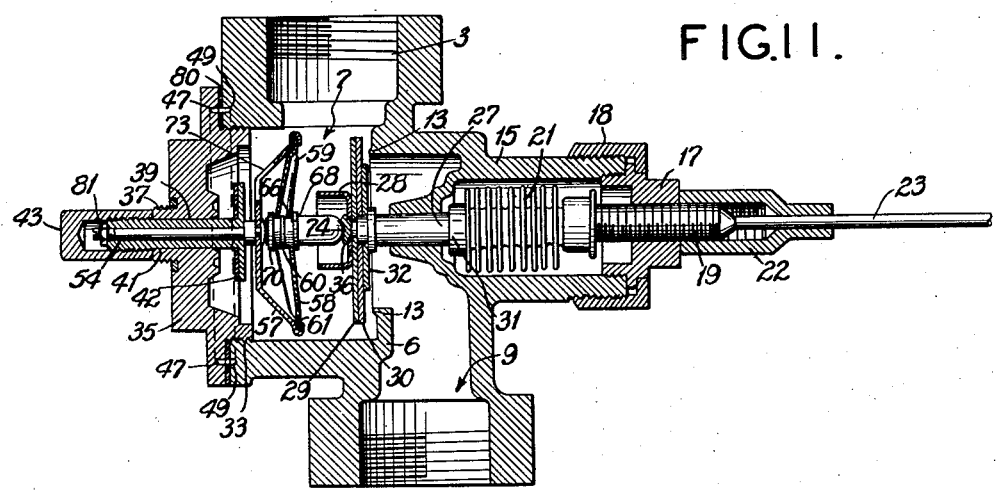
Figure 12:
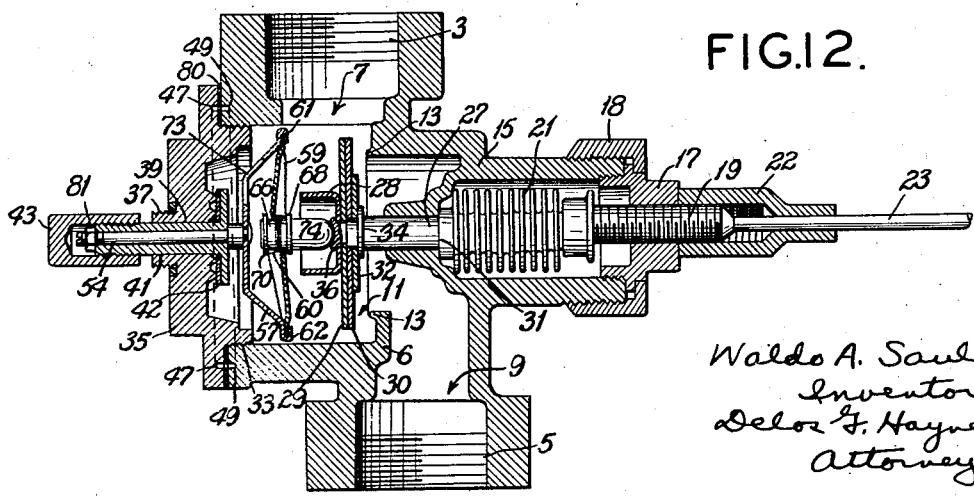

However, assuming that the operator, for the time being, holds the push button 43 in its Fig. 10 position, it will be seen that gas will flow to the preheat pilot burner 53. If this is ignited, it will heat the bulb 25, and the fluid in the bulb and bellows system will commence to expand. Ultimately, the expansion will be sufficient so that the end 31 of the bellows 21 will react against the valve stem 27 with a force sufficient to carry the disc 58 from its intermediate displaced position (Fig. 10) the rest of the way to its position of comparative stability (Fig. 11). When this condition has been achieved, the operator will find that he can relax his hold on the button 43. The button will thereupon move back to its extended position, but without a snap movement. This position is illustrated in Fig. 12. Here it will be seen that the disc 58 is now maintained in its leftward conical position, or position of comparative stability, not by the manually applied force of the operator, but by the force exerted by the bellows 21. The position of the elements is now such that the main valve 29 is unseated from its seat 13, permitting the flow of gas to the outlet chamber 9 and thence, ordinarily, to the main burner. The stem 41 being in its extended position, however, the back-seating valve 42 is now seated upon its seat 40, preventing the flow of gas through the line 52 to the preheat pilot burner 53. The disc 58 is maintained in its position of comparative stability by the force exerted on its central portion by the plug 66, reacting against the now rigidly held periphery of the disc (rigid because of the seating of the back-seating valve 42).

The bulb 25 is normally so positioned that, as long as a main pilot burner (not shown), which receives its gas supply from the outlet 10 or the outlet 9, is burning, the fluid is maintained hot enough to sustain the force necessary to keep the disc 58 in its position of comparative stability (Fig. 12).

If, however, the main burner should go out permitting the fluid in the bulb and bellows system to cool, the bellows 21 will no longer maintain the necessary force on the disc 58, and said disc 58 will instantaneously snap to its position of absolute stability (Fig. 5). In so doing, it will close the main valve 29 upon its seat 13, thus returning all of their elements to their initial, or Fig. 5, position. Before further operation of the main burner can then be obtained, it is necessary that an operator manually push the button 43, or, in other words, repeat the cycle of events above described.

It is to be noted that the adjustment of the bellows 21 in the housing 15 is so arranged that under normal temperature conditions the force of the bellows 21 is never permitted to build up to such a value as would overcenter the disc from its position of absolute stability to its position of comparative stability, for the particular disc 58 used, although a force slightly exceeding the force necessary to maintain the disc in its position of comparative stability is reached when the bulb 25 is heated.

A particular advantage of a valve constructed in this manner is the promptness with which it may be said to go "off" immediately after the flame at the main pilot burner, or at the main burner, has been extinguished. It will be understood that the action of the fluid in the bulb 25 is essentially a thermostatic one; that is, control is effected in accordance with the temperature of the fluid. Now, with all snap-acting thermostatic devices there is present what is known as an operating differential. That is to say, on decreasing temperature, an action will be performed when a temperature, say 100° is achieved, while on increasing temperature with the same device, a contrary action will be achieved with a temperature of say 150°. The difference between these values (e. g., 50°) represents what is spoken of as the operating differential of the thermostat. Now, in connection with safety devices of the type herein concerned, it is desirable that the operating temperature differential be reduced to an absolute minimum, for it is advantageous, of course, to shut off the flow of gas immediately upon extinguishment of the pilot burner. The valve described is so designed that thermostatic operation is had only upon the lower value of the two limit figures going to make a temperature differential. The upper value is, for practical purposes, beyond reach, and is replaced by the manual actuation of the button necessary before the valve can move to open position. Thus, the valve as described may be adjusted so that the normal temperature induced by the pilot or main burner flame is just sufficient to provide a force at the bellows 21 which very slightly exceeds that needed to hold the disc 58 in its position of comparative stability, for the particular disc 58 employed. Then, almost instantaneously after the flame is extinguished, the slight drop of temperature in the bulb 25 is sufficient to cause the pressure in the bellows 21, and hence the applied force, to decrease below the required value, and hence cause the valve to close.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control comprising a relatively stationary element and a cooperating relatively movable element, and a system for operating said movable element, said system comprising a device having a position of absolute stability and a position of comparative stability and being capable of movement under the application of external force from its position of absolute stability to its position of comparative stability but being capable of moving without the application of external force from its position of comparative stability to its position of absolute stability, manually operable means mounting said device at one region thereof and operable to displace said device from its position of absolute stability only to an intermediate position, and thermally responsive means operable to supply sufficient force to said device to move it from said intermediate position to its position of comparative stability, but insufficient to move it from its position of absolute stability to said intermediate position.

2. A control as set forth in claim 1 in which the device comprises a snap-acting disc, the manually operable means engaging said disc at the periphery thereof, and the thermally responsive means applying its force at the central region of the disc.

3. A control as set forth in claim 1 in which the relatively stationary element is a body having an inlet and an outlet and a valve seat therebetween, the relatively movable element is a main valve closure cooperating with said valve seat, and the thermally responsive means reacts directly against the main valve, and the main valve in turn transmits the force of said thermally responsive means to said device.

4. A valve comprising a body portion having an inlet and an outlet, a valve seat between said inlet and outlet, and a valve closure element adapted to seat upon said seat, a radially corrugated, snap-acting disc having a position of absolute stability and an over-centered position of comparative stability, said disc at all times manifesting a tendency to return automatically to its position of absolute stability, manually operable means mounting said disc at the periphery thereof, and means connecting the central portion of said disc to said valve closure element, thermally responsive means operable, upon increase of temperature, to apply a force to said closure element tending to unseat the same, said force, however, being insufficient to unseat said closure element when said disc is in its position of absolute stability, but being sufficient to unseat said closure element when said disc is in an intermediate position between its positions of absolute and comparative stability, and sufficient to maintain said closure element unseated when said disc is in its position of comparative stability, said manually operable means being operable, upon suitable actuation, to move said disc from its position of absolute stability only to its said intermediate position.

5. A valve as set forth in claim 4, in which the body portion is provided with an auxiliary outlet, and a back-seating valve closure means on said manually operable means controlling the passage of fluid to said auxiliary outlet, whereby, upon actuation of said manually operable means, flow of fluid to said auxiliary outlet is permitted.

6. A valve as set forth in claim 4, in which the thermally responsive means comprises a sealed bulb and bellows unit.

7. A control as set forth in claim 1, in which the thermally responsive means comprises a sealed bulb and bellows unit.

8. In a thermally responsive device, an actuating element comprising a snap-acting device having a position of comparative stability and a position of absolute stability, said device having an inherent tendency to return automatically from its position of comparative stability to its position of absolute stability, manually operable means for moving said device from its position of absolute stability only to a position intermediate its positions of absolute and comparative stability, and thermally responsive means capable, under ordinary temperature variations, of moving said device from its intermediate position to its position of comparative stability and capable of maintaining said device in its position of comparative stability, but being incapable of moving said device from its position of absolute stability to its position of comparative stability.

9. A thermally responsive device as set forth in claim 8, in which the snap-acting device comprises a resilient disc.

10. A thermally responsive device as set forth in claim 8, in which the thermally responsive means comprises a sealed bulb and bellows unit.

11. A thermally responsive device as set forth in claim 8, in which the snap-acting device comprises a radially corrugated disc, and the thermally responsive means comprises a sealed bulb and bellows unit.

WALDO A. SAUL.